(12) United States Patent
Bone

(10) Patent No.: US 9,102,904 B2
(45) Date of Patent: Aug. 11, 2015

(54) MICROCAPSULES, A PROCESS OF MAKING SUCH MICROCAPSULES AND COMPOSITIONS UTILIZING SUCH MICROCAPSULES

(71) Applicant: GIVAUDAN SA, Vernier (CH)

(72) Inventor: Stephane Bone, Estouteville Ecalles (FR)

(73) Assignee: Givaudan SA, Vernier (CH)

( * ) Notice: Subject to any disclaimer, the term of this patent is extended or adjusted under 35 U.S.C. 154(b) by 0 days.

(21) Appl. No.: 14/360,336

(22) PCT Filed: Dec. 7, 2012

(86) PCT No.: PCT/EP2012/074757
§ 371 (c)(1),
(2) Date: May 23, 2014

(87) PCT Pub. No.: WO2013/083760
PCT Pub. Date: Jun. 13, 2013

(65) Prior Publication Data
US 2014/0331414 A1 Nov. 13, 2014

(30) Foreign Application Priority Data
Dec. 7, 2011 (EP) ..................... 11290567

(51) Int. Cl.
C11D 3/50 (2006.01)
C11D 9/36 (2006.01)
B01J 13/18 (2006.01)
C11D 17/00 (2006.01)
D06M 23/12 (2006.01)
B01J 13/14 (2006.01)

(52) U.S. Cl.
CPC ............... *C11D 3/505* (2013.01); *B01J 13/14* (2013.01); *B01J 13/18* (2013.01); *C11D 17/0039* (2013.01); *D06M 23/12* (2013.01)

(58) Field of Classification Search
CPC ........ C11D 3/162; C11D 3/373; C11D 3/505; C11D 3/50; C11D 3/502; C11D 3/507; C11D 9/225; C11D 9/36; C11D 17/0021
See application file for complete search history.

(56) References Cited

U.S. PATENT DOCUMENTS

| | | | |
|---|---|---|---|
| 3,933,712 A * | 1/1976 | Vanaglash, Jr. .............. | 523/219 |
| 6,531,160 B2 * | 3/2003 | Biatry et al. .................. | 424/490 |
| 6,855,335 B2 * | 2/2005 | Seok et al. .................... | 424/489 |
| 2004/0182711 A1 | 9/2004 | Liang et al. | |
| 2008/0293908 A1 | 11/2008 | Ludewig et al. | |
| 2010/0148666 A1 * | 6/2010 | Liu et al. ........................ | 313/512 |
| 2010/0203096 A1 * | 8/2010 | Tanaka et al. ................ | 424/401 |
| 2011/0200654 A1 | 8/2011 | Habar | |
| 2011/0311723 A1 * | 12/2011 | Bekemeier et al. ........... | 427/209 |
| 2012/0237578 A1 | 9/2012 | Lei et al. | |

FOREIGN PATENT DOCUMENTS

| | | |
|---|---|---|
| EP | 2080552 A1 | 7/2009 |
| EP | 2196257 A2 | 6/2010 |
| EP | 2500087 A2 | 9/2012 |
| GB | 2416524 A | 2/2006 |
| WO | 0216020 A | 2/2002 |
| WO | 2005009604 A1 | 2/2005 |
| WO | 2009106318 A2 | 9/2009 |
| WO | 2009147119 A1 | 12/2009 |
| WO | 2010046583 A1 | 4/2010 |
| WO | 2011124706 A1 | 4/2011 |
| WO | 2012038666 A1 | 3/2012 |

OTHER PUBLICATIONS

International Search report for PCT/EP2012/074757 dated Jul. 3, 2013.
Written Opinion of the International Searching Authority for PCT/EP2012/074757 dated Jul. 3, 2013.
International Search report for PCT/EP2009/056705 dated Sep. 10, 2009.
GB Search Report for GB1205052.2 dated Jul. 13, 2012.
International Preliminary Report on Patentability and Written Opinion for PCT/EP2009/001349 dated Nov. 23, 2010.
R. Ciriminna, et al, "From Molecules to Systems: Sol-Gel Microencapsulation in Silica-Based Materials", American Chemical Society, Chemical Reviews, A-Y, May 2010.

* cited by examiner

*Primary Examiner* — Charles Boyer
(74) *Attorney, Agent, or Firm* — Norris McLaughlin & Marcus PA

(57) ABSTRACT

A method of forming active-containing microcapsules by the steps of
  (i) emulsifying the active in water in the presence of a polymeric emulsifier;
  (ii) adding to the emulsion thus formed a blend of at least 2 silanes and hydrolysing them prior to
  (iii) forming a shell by increasing the pH
characterised in that
  (iv) the polymeric emulsifier also acts as a templating agent for the organosilicon compounds;
  (v) the silanes are compounds of the Formula I

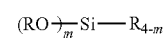

$$(RO)_{\overline{m}}Si - R_{4-m} \qquad I$$

in which R is independently $C_1$-$C_4$ linear or branched alkyl or alkene, optionally comprising a functional group selected from amino and epoxy, m is from 1-4, and selected such that there is present at least 2 silanes with different functionalities m.
The resulting microcapsules have excellent properties, and are especially effective for use with fragrances.

16 Claims, No Drawings

MICROCAPSULES, A PROCESS OF MAKING SUCH MICROCAPSULES AND COMPOSITIONS UTILIZING SUCH MICROCAPSULES

This is an filed under 35 USC 371 of PCT/EP2012/074757, which in turn claims priority to EP 11290567.4 filed 07. Dec.2011.

This disclosure relates to microcapsules, to a method of making such capsules, and to compositions utilizing such microcapsules.

Microcapsules, small particles of liquid or solid surrounded by a wall, have been known for many years. Since the publication of the original microcapsules in U.S. Pat. Nos. 2,800,457-8, the field has expanded widely, and microcapsules of many wall materials containing many fill particles have been used in many fields. The nature of the fill particles can be any of a great number. They are typically active ingredients, whose protection or delayed release is desired, typical examples including (but not limited to) sunscreens, dyestuffs, adhesives and adhesive components, fragrances, vitamins, pharmaceutically-active substances, cosmetically-active substances, flavours, pesticides, plant protection materials, water repellents, flame retardants, phase change materials and catalysts for chemical reactions.

One of the most common methods of microcapsule formation is coacervation, in which the fill particles are dispersed in a continuous medium in which the wall material or a precursor thereof is dissolved, and this wall material is then caused to come out of solution on to the disperse particles to form the wall.

There is an interest in the encapsulation of volatile materials, such as perfumes or flavours, for the purposes of delayed release in various applications related to food or consumer goods, such as deodorants and washing detergents. The microcapsules are expected to retain all or at least substantially all of the perfume until release (by breakage). Typical materials for perfume encapsulation include amine-aldehyde resins, notably melamine-formaldehyde and crosslinked gelatine. Melamine-formaldehyde (MF) has the advantages of good perfume retention, cheapness and the ability to be given easily the right degree of frangibility. However, MF has a number of disadvantages. One of the most significant of these is the undesirable presence of free formaldehyde. As a result, a substantial patent literature has arisen, all seeking to overcome the free formaldehyde problem. Others include a limited intrinsic diffusion of fragrance and restrictions on the fragrance formulae that can be used.

A number of other capsule materials have been tried, such as polyurea, acrylic, polyamide and silicate, but all have their own particular disadvantages, such as objectionable materials, poor stability and unsatisfactory performance.

The disadvantages of these established approaches to encapsulation has resulted in a number of new approaches to the problem, seeking to overcome these disadvantages. One such approach has been the idea that amine group-bearing polysiloxanes crosslinked by polyisocyanates can be used for shell formation (WO 2009/147119). A further development has been the use of inorganic materials, such as oxides, to strengthen the walls WO 02/16020) A still further approach has been the creation of capsules with silicate walls, derived from alkoxysilanes (WO 2009/106318).

It has now been found that it is possible to prepare microcapsules with excellent active-holding and -releasing properties, and which are completely formaldehyde-free. There is therefore provided a method of forming active-containing microcapsules by the steps of (i) emulsifying the active in water in the presence of a polymeric emulsifier;
(ii) adding to the emulsion thus formed a blend of at least 2 silanes and hydrolysing them prior to
(iii) forming a shell by increasing the pH
characterised in that
(iv) the polymeric emulsifier also acts as a templating agent for the organosilicon compounds;
(v) the silanes are compounds of the Formula I

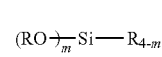

$$(RO)_{m}\text{—Si—}R_{4-m} \qquad I$$

in which R is independently $C_1$-$C_4$ linear or branched alkyl or alkene, optionally comprising a functional group selected from amino and epoxy, m is from 1-4, and selected such that there is present at least 2 silanes with different functionalities m.

There is also provided active-containing microcapsules preparable as hereinabove described.

Although the following description will make particular reference to fragrance, one of the most important fields of encapsulation and in some ways one of the most problematic, the disclosure is not limited to fragrance, and any other active whose encapsulation is desired is also encompassed. These include, but are not limited to, those hereinabove mentioned. It will be appreciated that not all such materials are appropriate for all applications, but the appropriate choice of materials and conditions is well within the ordinary skill of the art.

The nature of the polymeric emulsifier is such that it not only serves as an emulsifier for the active (in that it has both lipophilic and hydrophilic components in suitable proportions), but it also acts as a templating agent. By "templating agent" is meant a material that facilitates the polymerisation of monomeric species by organising them into a desired configuration for polymerisation. The term "template polymerisation" is known in the art, and the technology is generally explained in, for example, by van Bommel et al in *Angew. Chem. Int. Ed.* 2003, 42, No. 9, 980-999. In template polymerisation, the template is often removed after the desired polymer is formed. However, as indicated in the van Bommel paper referred to hereinabove, the templating agent/surfactant may remain in place, resulting in an organic/inorganic hybrid. It has been found that the combination of such a hybrid structure with a subsequent in situ-formed polymer leads to microcapsules with desirable properties.

Any compound or combination of compounds that can perform both of these functions is useful as a polymeric emulsifier in this disclosure. One particular example is a polyanhydride, which is made up of monomer units of the type shown in the formula II

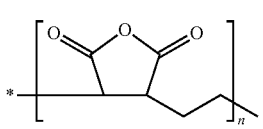

where n is of a magnitude to give a molecular weight of between 1000 and 2 million. The material is commercially available, for example, as ZeMac™ E400. commercialised by Vertellus Other examples include but are not limited to:

Polymers containing lactam groups, for example, polyvinylpyrrolidone (PVP), poly-(N-vinyl caprolactam) (PNVC)

Polymers containing ether groups either in the backbone (for example, polyethylene oxide), polypropylene glycol) or as pendant moieties (for example, poly(vinyl methyl ether));

Acrylic polymers, for example, polymethacrylic acid, polyacrylamide, poly(N-isopropylacrylamide), poly(N, N-dimethylacrylamide)

Polymeric alcohols, for example, poly(vinyl alcohol), poly (-hydroxyethyl acrylate), poly(-hydroxyethyl vinyl ether)

Other synthetic polymers, for example, poly(-ethyl-2-oxazoline), poly(N-acetyliminoethylene), styrene-maleic anhydride copolymer;

Water soluble non-ionic polysaccharides, for example, methylcellulose, hydroxyethyl cellulose, hydroxypropyl cellulose, hydroxypropyl methyl cellulose and carboxymethylcellulose.

Without restricting the disclosure in any way, it is believed that the compounds useful as polymeric emulsifiers/templating agents in this disclosure are materials that form strong hydrogen-bonded complexes. The materials hereinabove named are not the only ones that can fulfil this function and the skilled person can readily find other suitable materials by routine, non-inventive experimentation.

In the case of PVP, it has been found surprisingly that the templating performance may be enhanced by adding a proportion of a cellulosic derivative, such as carboxymethyl cellulose (CMC). The weight proportions necessary are 50-90% cellulosic derivative and 10-50% PVP, particularly 65-75% CMC-25-35% PVP.

The silanes are chosen from the formula I above, such that the mixture has at least 2 silanes with 2 different functionalities in which m is 2, m is 3 and m is 4. These will be described with reference to a three-monomer system with three particular monomers, although the description is not limited to these, and it is possible to mix different silanes of the same type, for example two or more silanes with m=2. The specific particular examples are methyl triethoxysilane (MTES), tetraethoxysilane (TEOS) and dimethyldiethoxysilane (DMDES):

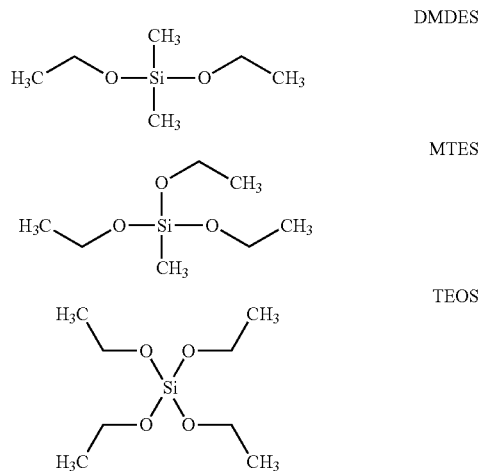

It is also possible to include a small proportion of silanes in which m=1, for example, triethylethoxysilane, but this should not exceed 5% of the total weight of silane The proportions of the various silane types influence the capsule properties. Mixing silanes with different functionalities impact on linear and cyclic inorganic network which leads to low porosity hybrid polymers.

The following illustration gives an indication of what happens when proportions change:

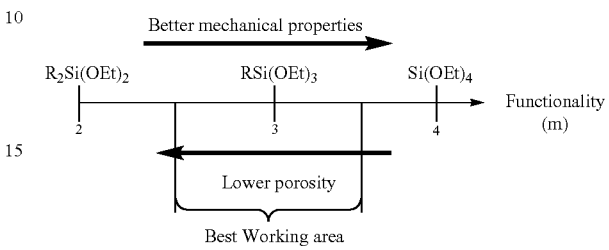

The important feature here is the functionality of the silane, that is, the value of m in Formula I. As the average functionality of the silane mixture increases, the mechanical properties improve but at the expense of stability. It has been found that the best compromise for these three materials for most purposes is to be found in an average functionality of from 2.5 to 3.5, more particularly from 2.6-3.2. However, the disclosure is not limited to these values, and microcapsules for particular purposes may be made outside these limits. In addition, different monomer mixtures will have slightly differing optimum average functionalities, but these may readily be determined by uninventive routine testing.

The silanes may be hydrolysed by altering the pH of the system to acid, particularly a pH of 2-3. This may be done by the addition of acid, typically organic acids such as acetic and formic acid and mixtures thereof. The result is the formation of a polymeric shell.

The shell is then crosslinked. This may be achieved by raising again the pH of the aqueous medium. This should be done gradually In a typical process, the pH is raised to 4.5 over 30 minutes, to 5 after a further 30 minutes, to 5.5 after a further 30 minutes, to 6 after a further 4 hours. It is preferred to stay in acid media during condensation step but reaction can be finished in basic media. These values are not fixed, and they can be altered according to requirements of particular materials and processes. The pH increase is effected by adding base, such as sodium hydroxide, sodium carbonate and ammonium hydroxide.

Active-containing microcapsules made according to this method have many advantages. They have excellent mechanical properties, which can be tailored to suit any particular use. They are highly impermeable, which means that loss of volatile material, such as fragrance, during storage is considerably reduced. Most significantly, they contain no formaldehyde or other undesirable or potentially hazardous compounds such as isocyanates, glutaraldehyde or epoxides.

In the case of fragrances, the capsules may be used in a wide variety of applications, such as consumer products, non-limiting examples of which include personal care products (cosmetics, soaps, shower gels, sunscreens), home care products (cleaning preparations for hard surfaces), laundry care products (liquid and powder washing detergents, fabric softeners and conditioners, laundry rinse-off products). There is therefore provided a consumer product comprising a consumer product base and active-containing capsules as hereinabove defined. (By "consumer product base" is meant the totality of all the other materials needed for the consumer product. These may be selected according to the normal practices and usages of the art).

In the case of fragrances, it has been found that the capsules hereinabove described allow for the encapsulation of an unusually wide spectrum of fragrance ingredients. It is well known that certain fragrance ingredients are potentially reactive with some encapsulation systems; for example, the popular melamine-formaldehyde systems have problems with certain aldehyde fragrance materials, and this may result in a released fragrance that is not quite the same as that which the perfumer developed. The capsules hereinabove described suffer from this problem to a much reduced extent, compared with known encapsulation methods.

In a further particular embodiment of fragrance-containing capsules, it has been found that certain of the capsules as hereinabove described are especially effective at releasing fragrance under wet conditions, for example, on damp fabrics. This is something that many capsules known to the art, such as aminoplast capsules, do not do very well, or sometimes not at all. Some capsules, such as starch-based capsules, release well in water, but are not so good on dry fabrics. Certain capsules as hereinabove described deliver equal performance in both wet and dry situations. There is therefore provided a method of providing a fragrance emission on a damp washed fabric, comprising treating the fabric with a laundry product comprising capsules prepared as hereinabove described, in which the emulsifying system that acts as a templating agent is selected from polyvinylpyrrolidone and mixtures thereof with a cellulosic derivative.

There is additionally provided a laundry product comprising capsules prepared as hereinabove described, in which the emulsifying system that acts as a templating agent is selected from polyvinylpyrrolidone and mixtures thereof with a cellulosic derivative.

The disclosure is further described with reference to the following examples, which depict particular embodiments, and which are not intended to be in any way limiting.

EXAMPLE 1

462 g of water, 15 g of formic acid and 250 g of a 10% polyvinylpyrrolidone solution are introduced into a 1 L reactor under stirring. The stirring speed is increased and 200 g of a proprietary perfume is added, followed by 30.3 g of MTES, 15.4 g of TEOS, 22.9 g of DMDES and 2.5 g of aminopropyltriethoxysilane at room temperature.

After 2 hours of hydrolysis, pH is slowly increased to 6 with a 20% sodium hydroxide solution and temperature increased to 80° C. After 4 hours at 80° C., the microcapsule slurry is slowly cooled to 25° C.

A slurry of microcapsules of solid contents 26.6% is obtained. The microcapsules have an average particle size of 20 micrometers.

EXAMPLE 2

The procedure of Example 1 is repeated, but using 58.3 g of MTES, 13.4 g of TEOS, 2.9 g of DMDES and 2.5 g of aminopropyltriethoxysilane.

The result is a slurry of microcapsules of solid contents 27.9% and an average particle size of 17 micrometers.

EXAMPLE 3

The procedure of Example 1 is repeated, but using 58.3 g of MTES, 13.4 g of TEOS, 2.9 g of DMDES and 2.5 g of aminopropyltriethoxysilane.

The result is a slurry of microcapsules of solid contents 27.9% and an average particle size of 17 micrometers.

EXAMPLE 4

The procedure of Example 1 is repeated but using 44.6 g of MTES, 16.4 g of TEOS, 11.4 g of DMDES and 2.5 g of aminopropyltriethoxysilane.

The result is a slurry of microcapsules of solid contents 26.2% and an average particle size of 17 micrometers.

EXAMPLE 5

The procedure of Example 3 is repeated with 300 g fragrance and 362 g water.

The result is a slurry of microcapsules of solid contents 41.7% and an average particle size of 17 micrometers.

EXAMPLE 6

610 g of water, 10 g of formic acid, 30 g of acetic acid and 75 g of a 10% ZEMAC solution are introduced into a 1 L reactor under stirring. The stirring speed is increased and 200 g of a proprietary perfume is added, followed by 36.8 g of MTES, 18.7 g of TEOS, 16 g of DMDES and 2.5 g of aminopropyltriethoxysilane at room temperature.

After 2 hours of hydrolysis, pH is slowly increased to 6 with a 20% ammonia solution and temperature increased to 80° C. After 4 hours at 80° C., the microcapsule slurry is slowly cooled to 25° C.

The result is a slurry of microcapsules of solid contents 21.8% and an average particle size of 20 micrometers.

EXAMPLE 7

410 g of water, 15 g of formic acid and 250 g of a 10% polyvinylpyrrolidone solution are introduced into a 1 L reactor under stirring. The stirring speed is increased and 200 g of a proprietary perfume is added, followed by 40.4 g of vinyltriethoxysilane, 16.4 g of TEOS, 11.4 g of DMDES and 2.5 g of aminopropyltriethoxysilane at room temperature.

After 2 hours of hydrolysis, pH is slowly increased to 6 with a 20% sodium hydroxide and temperature increased to 80° C. After 4 hours at 80° C., the microcapsule slurry is slowly cooled to 25° C.

The result is a slurry of microcapsules of solid contents 24.5% and an average particle size of 22 micrometers.

EXAMPLE 8

462 g of water, 15 g of formic acid and 250 g of a 10% Polyvinylpyrrolidone solution are introduced into a 1 L reactor under stirring. The stirring speed is increased and 200 g of a proprietary perfume is added, followed by 58.6 g of MTES, 17.9 g of TEOS and 2.5 g of aminopropyltriethoxysilane at room temperature.

After 2 hours of hydrolysis, pH is slowly increased to 6 with a 20% ammonia solution and temperature increased to 80° C. After 4 hours at 80° C., the microcapsule slurry is slowly cooled to 25° C.

The result is a slurry of microcapsules of solid contents 27.7% and an average particle size of 23 micrometers.

EXAMPLE 9

440 g of water, 15 g of formic acid and 250 g of a 10% polyvinylpyrrolidone solution are introduced into a 1 L reactor under stirring. The stirring speed is increased and 200 g of a proprietary perfume is added, followed by 40.1 g of MTES, 16.4 g of TEOS, 11.4 g of DMDES, 3.2 g of phenyltriethoxysilane and 2.5 g of aminopropyltriethoxysilane at room temperature.

After 2 hours of hydrolysis, pH is slowly increased to 6 with a 20% sodium hydroxide solution and temperature increased to 80° C. After 4 hours at 80° C., the microcapsule slurry is slowly cooled to 25° C.

The result is a slurry of microcapsules of solid contents 28.1% and an average particle size of 22 micrometers.

EXAMPLE 10

440 g of water, 15 g of formic acid and 250 g of a 10% polyvinylpyrrolidone solution are introduced into a 1 L reactor under stirring. The stirring speed is increased and 200 g of a proprietary perfume is added, followed by 40.1 g of MTES, 16.4 g of TEOS, 11.4 g of DMDES, 3.2 g of phenyltriethoxysilane and 2.5 g of aminopropyltriethoxysilane at room temperature.

After 2 hours of hydrolysis, pH is slowly increased to 6 with a 20% sodium hydroxide solution and temperature increased to 80° C. After 4 hours at 80° C., the microcapsule slurry is slowly cooled to 25° C.

The result is a slurry of microcapsules of solid contents 28.1% and an average particle size of 22 micrometers.

EXAMPLE 11

An example with an average functionality of 3.6, just outside the desirable range.

The procedure of Example 1 is repeated, but using 8.5 g of MTES, 68.4 g of TEOS, 8.6 g of DMDES and 2.5 g of aminopropyltriethoxysilane.

The result is a slurry of microcapsules of solid contents 15.8% and an average particle size of 35 micrometers. It can be seen that the microcapsules are larger and that the solids content is lower. Moreover, durability tests show that, when exposed to a one-week storage at 37° C. in a fabric conditioner composition as described in Example 12 below, the capsules appear to have lost all of the encapsulated fragrance, indicating a porosity that, while acceptable in some cases, is not acceptable here.

EXAMPLE 12

70 g of water, 15 g of formic acid, 100 g of a 10% polyvinylpyrrolidone solution and 400 g of a 2% CMC 7LF solution are introduced into a 1 L reactor under stirring. The stirring speed is increased and 200 g of a proprietary perfume is added, followed by 44.1 g of MTES, 16.4 g of TEOS, 11.4 g of DMDES and 2.5 g of aminopropyltriethoxysilane at room temperature.

After 2 hours of hydrolysis, pH is slowly increased to 6 with a 20% sodium hydroxide solution and temperature increased to 80° C. After 4 hours at 80° C., the microcapsule slurry is slowly cooled to 25° C.

The result is a slurry of microcapsules of solid contents 28.1% and an average particle size of 11 micrometers.

EXAMPLE 13

Testing of Microcapsules
Microcapsules are tested in the following fabric conditioner formulation

| Commercial name. | Chemical name | Supplier | % in weight |
|---|---|---|---|
| Water | | | 83.95 |
| MgCl$_2$ | Magnesium chloride | | 1 |
| Rewoquat™ WE 18 | Di-(tallow carboxyethyl)hydroxyl ethyl methylammonium methosulfate | Goldschmidt | 12 |
| Neodol™ 91-8E | Ethoxylated fatty alcohol C16-C18 10 EO | Givaudan | 2 |
| Q4™ | Silicone | Dow corning | 1 |
| Bronidox™ L | 2-bromo-2-nitropropane | Cognis | 0.03 |
| Proxel™ GWL | Benzisothiazolinone | ICI | 0.02 |

The capsules as prepared in Example 4 are used. They are added to the fabric conditioner formulation in the form of an aqueous slurry.

Into another sample of the same fabric conditioner is loaded a slurry of melamine-formaldehyde (MF) microcapsules prepared as described in European Patent 2111214, loaded with the same perfume to the same extent.

A further sample of the fabric conditioner has no encapsulated perfume, only free perfume of the same type as that encapsulated, added to give the same proportion of perfume.

The two microcapsule types are added in proportions sufficient to provide in the formulation a perfume concentration of 0.2% by weight. In this particular case, the MF capsule content (perfume loading 36%) is 0.56% of the formulation and the Example 4 content (perfume loading 20%) is 1%. The sample with no microcapsules has 0.2% of free perfume.

Identical samples of terry towelling are washed with each of the fabric conditioners under the same conditions. The results are judged by an experienced testing panel on a scale of 0-10, as follows:
0=no odour detectable
2=odour barely perceptible
4=odour weakly perceptible
6=odour easily perceptible
8=odour strong
10=odour very strong The results are shown in Table 1 at initial time and in Table 2 after 2 months

TABLE 1

| Fabric conditioner | Line dried unrubbed | Line dried rubbed | Tumble dried unrubbed | Tumble dried rubbed |
|---|---|---|---|---|
| Example 4 | 4 | 6 | 3 | 5 |
| Example 12 | 4 | 6 | 4 | 6 |
| MF capsules | 3 | 6 | 3 | 6 |
| Free perfume | 1 | 1 | 1 | 1 |

TABLE 2

| Fabric conditioner | Line dried unrubbed | Line dried rubbed | Tumble dried unrubbed | Tumble dried rubbed |
|---|---|---|---|---|
| Example 4 | 3 | 4 | 3 | 4 |
| Example 12 | 4 | 6 | 4 | 6 |
| MF capsules | 3 | 5 | 3 | 5 |
| Free perfume | 1 | 1 | 1 | 1 |

The air freshening effect, that is to say the capacity of the technology to release perfume during drying is evaluated over 24 hours and compared to that of the abovementioned melamine-formaldehyde microcapsules. They are evaluated on the same scale as hereinabove described, with the results as shown in Table 3

TABLE 3

|  | Intensity score | | | | |
| --- | --- | --- | --- | --- | --- |
|  | 0 h | 2 h | 4 h | 6 h | 24 h |
| Melamine formaldehyde | 1.5 | 0.5 | 0.5 | 0.5 | 0 |
| Example 4 | 5 | 4.5 | 2 | 2 | 0 |
| Free Fragrance | 3.5 | 3 | 2 | 2 | 0 |

The invention claimed is:

1. A method of forming active-containing microcapsules by the steps of
   (i) emulsifying the active in water in the presence of a polymeric emulsifier;
   (ii) adding to the emulsion thus formed a blend of at least 2 silanes and hydrolysing them prior to
   (iii) forming a shell by increasing the pH characterised in that
   (iv) the polymeric emulsifier also acts as a templating agent for the organosilicon compounds;
   (v) the silanes are compounds of the Formula I

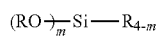

in which R is independently $C_1$-$C_4$ linear or branched alkyl or alkene, optionally comprising a functional group selected from amino and epoxy, m is from 1-4, and selected such that there is present at least 2 silanes with different functionalities m.

2. A method according to claim 1, in which the polymeric emulsifier is selected from the group consisting of
   Polymers containing lactam groups, particularly polyvinylpyrrolidone (PVP) and poly-(N-vinyl caprolactam) (PNVC);
   Polymers containing ether groups either in the backbone or as pendant moieties, particularly polyethylene oxide, polypropylene glycol and poly(vinyl methyl ether);
   Acrylic polymers, particularly polymethacrylic acid, polyacrylamide, poly(N-isopropylacrylamide) and poly(N,N-dimethylacrylamide);
   Polymeric alcohols, particularly poly(vinyl alcohol), poly(2-hydroxyethyl acrylate) and poly(2-hydroxyethyl vinyl ether);
   Other synthetic polymers, particularly poly(2-ethyl-2-oxazoline), poly(N-acetyliminoethylene) and styrene-maleic anhydride copolymer;
   Water soluble non-ionic polysaccharides, particularly methylcellulose, hydroxyethyl cellulose, hydroxypropyl cellulose, hydroxypropyl methyl cellulose and carboxymethylcellulose; and
   Polyanhydrides made up of monomer units of the type shown in the formula II

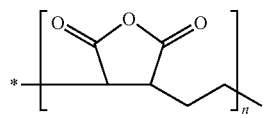

where n is of a magnitude to give a molecular weight of between 1000 and 2 million.

3. A method according to claim 2, in which the polymeric emulsifier is PVP in combination with a cellulosic derivative.

4. A method according to claim 3, in which the weight proportions are 50-90% cellulosic derivative and 10-50% PVP, particularly 65-75% cellulosic derivative-25-35% PVP.

5. A method according to claim 2 in which the cellulosic derivative is carboxymethyl cellulose (CMC).

6. A method according to claim 1, in which there are at least three different silanes present.

7. A method according to claim 6, in which the silanes are methyl triethoxysilane (MTES), tetraethoxysilane (TEOS) and dimethyldiethoxysilane (DMDES).

8. A method according to claim 7, in which the average silane functionality is from 2.5 to 3.5, particularly from 2.6-3.2.

9. A method according to claim 1, in which silanes with m=1 are present to a maximum extent of 5% by weight.

10. A method according to claim 1, in which the silanes are hydrolysed to form a polymeric shell by altering the pH of the system to acid, particularly to a pH of 2-3.

11. A method according to claim 1, in which the shell is crosslinked by raising the pH to 4.5 over 30 minutes, to 5 after a further 30 minutes, to 5.5 after a further 30 minutes, to 6 after a further 4 hours.

12. A method according to claim 1, in which the active is fragrance.

13. Active-containing microcapsules prepared by a method according to claim 1.

14. A consumer product comprising a consumer product base and active-containing capsules according to claim 3.

15. A method of providing a fragrance emission on a damp washed fabric, comprising treating the fabric with a laundry product comprising fragrance-containing capsules prepared according to claim 1, in which the polymeric emulsifier is selected from polyvinylpyrrolidone and mixtures thereof with a cellulosic derivative.

16. A laundry product comprising capsules prepared according to claim 1, in which the emulsifying system that acts as a templating agent is selected from polyvinylpyrrolidone and mixtures thereof with a cellulosic derivative.

* * * * *